(12) United States Patent
Park et al.

(10) Patent No.: US 7,809,373 B2
(45) Date of Patent: Oct. 5, 2010

(54) METHOD OF TRANSMITTING AND RECEIVING RADIO ACCESS INFORMATION IN A WIRELESS MOBILE COMMUNICATIONS SYSTEM

(75) Inventors: Sung Jun Park, Gyeonggi-do (KR); Young Dae Lee, Gyeonggi-do (KR); Sung Duck Chun, Gyeonggi-do (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 11/553,939

(22) Filed: Oct. 27, 2006

(65) Prior Publication Data
US 2007/0047493 A1    Mar. 1, 2007

Related U.S. Application Data

(60) Provisional application No. 60/732,080, filed on Oct. 31, 2005.

(30) Foreign Application Priority Data
Jul. 5, 2006    (KR)    ........................ 10-2006-0063135

(51) Int. Cl.
*H04W 36/00*    (2009.01)
(52) U.S. Cl. ........................ 455/436; 370/338; 370/349; 455/552
(58) Field of Classification Search ................. 455/552, 455/450, 452, 458, 435, 436, 509; 370/338, 370/349, 329, 328, 466, 469, 335
See application file for complete search history.

(56) References Cited

U.S. PATENT DOCUMENTS

| 6,359,867 | B1 | 3/2002 | Ali-Vehmas |
| 6,628,946 | B1 | 9/2003 | Wiberg et al. |
| 6,968,192 | B2 | 11/2005 | Longoni |
| 2001/0016496 | A1 | 8/2001 | Lee |
| 2001/0030956 | A1 | 10/2001 | Chillariga et al. |
| 2002/0048266 | A1 * | 4/2002 | Choi et al. .................. 370/331 |

(Continued)

FOREIGN PATENT DOCUMENTS

EP    1505782    2/2005

(Continued)

OTHER PUBLICATIONS

Onoe et al., "Control Channel Structure for TDMA Mobile Radio Systems,"40th IEEE Vehicular Technology Conference, May 6-9, 1990, Orlando (US), pp. 270-275.

*Primary Examiner*—Vincent P Harper
*Assistant Examiner*—Mahendra Patel
(74) *Attorney, Agent, or Firm*—Lee, Hong, Degerman, Kang & Waimey

(57) ABSTRACT

In a wireless mobile communications system, a method of transmitting and receiving radio access information that allows a faster and an efficient way of establishing a radio connection between a terminal and a target base station while performing a handover for the terminal to a cell of the target base station. The network transmits in advance, the radio access information and the like, to the terminal so that the terminal can be connected with the target cell in a faster manner which minimizes the total time for the handover process.

26 Claims, 7 Drawing Sheets

U.S. PATENT DOCUMENTS

| | | |
|---|---|---|
| 2002/0052206 A1 | 5/2002 | Longoni |
| 2002/0181436 A1 | 12/2002 | Mueckenheim et al. |
| 2003/0026324 A1* | 2/2003 | Li et al. .................. 375/141 |
| 2003/0054829 A1 | 3/2003 | Moisio |
| 2003/0076812 A1* | 4/2003 | Benedittis ................ 370/350 |
| 2003/0081586 A1* | 5/2003 | Malladi et al. |
| 2003/0095552 A1 | 5/2003 | Bernhard et al. |
| 2003/0131300 A1 | 7/2003 | Park et al. |
| 2004/0022217 A1* | 2/2004 | Korpela et al. ............ 370/335 |
| 2004/0029532 A1* | 2/2004 | Schwarz et al. ........... 455/63.1 |
| 2004/0053614 A1* | 3/2004 | Il-Gyu et al. .............. 455/436 |
| 2004/0085926 A1* | 5/2004 | Hwang et al. ............. 370/328 |
| 2004/0162072 A1 | 8/2004 | Sigle et al. |
| 2005/0059437 A1* | 3/2005 | Son et al. .................. 455/574 |
| 2005/0094586 A1 | 5/2005 | Zhang et al. |
| 2005/0138528 A1 | 6/2005 | Ameigeiras et al. |
| 2005/0159161 A1 | 7/2005 | Florkey et al. |
| 2005/0177623 A1 | 8/2005 | Roberts et al. |
| 2006/0039327 A1* | 2/2006 | Samuel et al. ............. 370/331 |
| 2007/0032255 A1* | 2/2007 | Koo et al. .................. 455/512 |

FOREIGN PATENT DOCUMENTS

| | | |
|---|---|---|
| EP | 1565026 | 8/2005 |
| JP | 2004-208177 | 7/2004 |
| JP | 2004208177 | 7/2004 |
| KR | 10-2003-0007481 | 1/2003 |
| KR | 10-2003-0056143 | 7/2003 |
| KR | 10-2003-0080946 | 10/2003 |
| KR | 10-2005-0032285 | 4/2005 |
| KR | 10-2005-0032949 | 4/2005 |
| KR | 10-2005-0078635 | 8/2005 |
| KR | 10-2005-0084908 | 8/2005 |
| KR | 10-0688303 | 3/2007 |
| RU | 2193281 | 11/2002 |
| TW | 236241 | 7/2005 |
| WO | 01/35586 | 5/2001 |
| WO | 03017544 | 2/2003 |
| WO | WO 03/017544 A1 | 2/2003 |
| WO | 03/096149 | 11/2003 |
| WO | 2005/011134 | * 2/2005 |
| WO | 2005/083912 | * 9/2005 |

* cited by examiner

METHOD OF TRANSMITTING AND RECEIVING RADIO ACCESS INFORMATION IN A WIRELESS MOBILE COMMUNICATIONS SYSTEM

CROSS REFERENCE TO RELATED APPLICATION

Pursuant to 35 U.S.C. §119, this application claims the benefit of earlier filing date and right of priority to U.S. Provisional Application No. 60/732,080, filed Oct. 31, 2005, and Korean Patent Application No. 10-2006-0063135, filed Jul. 5, 2006, the contents of which are hereby incorporated by reference herein in their entirety.

FIELD OF THE INVENTION

The present invention relates to wireless (radio) mobile communications systems, and in particular, relates to a method of transmitting and receiving radio connection information that allows a terminal to access a target base station (i.e., target eNB) in a faster and more efficient manner while performing a handover for the terminal to a cell of the target base station.

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 shows an exemplary diagram illustrating an Universal Mobile Telecommunication System (UMTS) network of a conventional mobile communication system. The UMTS is comprised of, largely, a user equipment (UE) or terminal, a UMTS Terrestrial Radio Access Network (UTRAN), and a core network (CN). The UTRAN comprises at least one Radio Network Sub-system (RNS), and each RNS is comprised of one Radio Network Controller (RNC) and at least one base station (Node B) which is controlled by the RNC. For each Node B, there is at least one cell.

FIG. 2 is an exemplary diagram illustrating a structure of a Radio Interface Protocol (RIP) between a UE and the UTRAN. Here, the UE is associated with a 3rd Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) based on an Open System Interconnection (OSI) model. Each layer will be described in more detail as follows. The first layer (L1), namely, the physical layer, provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer (L2) provides an upper layer called a radio link control (RLC) layer with a service through a logical channel. The RLC layer of the second layer supports reliable data transfer and performs segmentation and concatenation of a service data unit (SDU) received from an upper layer.

A radio resource control (RRC) layer at a lower portion of the L3 layer is defined in the control plane and controls logical channels, transport channels, and physical channels for configuration, re-configuration and release of radio bearers (RBs). A RB is a service provided by the second layer for data transfer between the terminal and the UTRAN. The configuration of the RBs includes defining characteristics of protocol layers and channels required to provide a specific service, and configuring respective specific parameters and operation methods.

A RRC connection and a signaling connection will be described in more detail as follows.

In order to perform communications, a terminal needs to have a RRC connection with the UTRAN and a signaling connection with the Core Network (CN). The terminal transmits and/or receives a terminal's control information with the UTRAN or the CN via the RRC connection and the signaling connection.

FIG. 3 shows an exemplary diagram for explaining how a RRC connection is established.

In FIG. 3, to establish the RRC connection, the terminal transmits a RRC Connection Request Message to the RNC, and then the RNC transmits a RRC Connection Setup Message to the terminal in response to the RRC Connection Request Message. After receiving the RRC Connection Setup Message by the terminal, the terminal transmits a RRC Connection Setup Complete Message to the RNC. If the above steps are successfully completed, the terminal establishes the RRC connection with the RNC. After the RRC connection is established, the terminal transmits an Initial Direct Transfer (IDT) message to the RNC for initializing a process of the signaling connection.

A Random Access Channel of a WCDMA will be described in more detail as follows.

The Random Access Channel (RACH) is used to transfer a short length data on an uplink, and some of the RRC message (i.e., RRC Connection Request Message, Cell Update Message, URA Update Message) is transmitted via the RACH. The RACH is mapped to a Common Control Channel (CCCH), a Dedicated Control Channel (DCCH) and a Dedicated Traffic Channel (DTCH), and then the RACH is mapped to a Physical Random Access Channel.

FIG. 4 shows how the physical random access channel (PRACH) power ramping and message transmission may be performed.

Referring to FIG. 4, the PRACH, which is an uplink physical channel, is divided into a preamble part and a message part. The preamble part is used to properly control a transmission power for a message transmission (i.e., a power ramping function] and is used to avoid a collision between multiple terminals. The message part is used to transmit a MAC PDU that was transferred from the MAC to the Physical channel.

When the MAC of the terminal instructs a PRACH transmission to the physical layer of the terminal, the physical layer of the terminal first selects one access slot and one (preamble) signature, and transmits the preamble on the PRACH to an uplink. Here, the preamble is transmitted within a particular the length of access slot duration (e.g., 1.33 ms). One signature is selected among the 16 different signatures within a first certain length of the access slot, and it is transmitted.

If the preamble is transmitted from the terminal, a base station transmits a response signal via an Acquisition indicator channel (AICH) which is a downlink physical channel. The AICH, in response to the preamble, transmits a signature that was selected within the first certain length of the access slot. Here, the base station transmits an ACK response or a NACK response to the terminal by means of the transmitted signature from the AICH.

If the ACK response is received, the terminal transmits a 10 ms or 20 ms length of the message part using an OVSF code that correspond with the transmitted signature. If the NACK response is received, the MAC of the terminal instructs the PRACH transmission again to the physical layer of the terminal after a certain time period. Also, if no AICH is received with respect to the transmitted preamble, the terminal transmits a new preamble with a higher power compared to that used for the previous preamble after a predetermined access slot.

FIG. 5 illustrates an exemplary structure of an Acquisition Indicator Channel (AICH).

As shown in FIG. 5, the AICH, which is a downlink physical channel, transmits 16 symbol signatures (Si, i=0, . . . 15) for the access slot having a length of 5120 chips. The terminal may select any arbitrary signature (Si) from S0 signature to S15 signature, and then transmits the selected signature during the first 4096 chips length. The remaining 1024 chips length is set as a transmission power off period during which no symbol is transmitted. Also, as similar to FIG. 5I, the preamble part of the uplink PRACH transmits 16 symbol signatures (Si, i=0, . . . , 15) during the first 4096 chips length.

An Evolved Universal Mobil Telecommunication System (E-UMTS) will be described in more detail as follows.

FIG. 6 shows an exemplary structure of an Evolved Universal Mobile Telecommunications System (E-UMTS). The E-UMTS system is a system that has evolved from the UMTS system, and its standardization work is currently being performed by the 3GPP standards organization.

The E-UMTS network generally comprises at least one mobile terminal (i.e., user equipment: UE), base stations (i.e., Node Bs), a control plane server (CPS) that performs radio (wireless) control functions, a radio resource management (RRM) entity that performs radio resource management functions, a mobility management entity (MME) that performs mobility management functions for a mobile terminal, and an access gateway (AG) that is located at an end of the E-UMTS network and connects with one or more external networks. Here, it can be understood that the particular names of the various network entities are not limited to those mentioned above.

The various layers of the radio interface protocol between the mobile terminal and the network may be divided into L1 (Layer 1), L2 (Layer 2), and L3 (Layer 3) based upon the lower three layers of the Open System Interconnection (OSI) standard model that is known the field of communication systems. Among these layers, a physical layer that is part of Layer 1 provides an information transfer service using a physical channel, while a Radio Resource Control (RRC) layer located in Layer 3 performs the function of controlling radio resources between the mobile terminal and the network. To do so, the RRC layer exchanges RRC messages between the mobile terminal and the network. The functions of the RRC layer may be distributed among and performed within the Node B, the CPS/RRM and/or the MME.

FIG. 7 shows an exemplary architecture of the radio interface protocol between the mobile terminal and the UTRAN (UMTS Terrestrial Radio Access Network). The radio interface protocol of FIG. 7 is horizontally comprised of a physical layer, a data link layer, and a network layer, and vertically comprised of a user plane for transmitting user data and a control plane for transferring control signaling. The radio interface protocol layer of FIG. 2 may be divided into L1 (Layer 1), L2 (Layer 2), and L3 (Layer 3) based upon the lower three layers of the Open System Interconnection (OSI) standards model that is known the field of communication systems.

Particular layers of the radio protocol control plane of FIG. 7 and of the radio protocol user plane of FIG. 8 will be described below. The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIG. 7 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a broadcast channel (BCH) used for transmitting system information, and a shared channel (SCH) used for transmitting user traffic or control messages. Also, as a downlink transport channel, there is a downlink Shared Control Channel (SCCH) that transmits necessary control information for the terminal to receive the downlink SCH. The downlink SCCH transmission includes information regarding a data variation, a data channel coding technique, and a data size where the data is transmitted to the downlink SCH.

As for channels used in uplink transmission for transmitting data from the mobile terminal to the network, there is a random access channel (RACH) used for transmitting an initial control message, and a shared channel (SCH) used for transmitting user traffic or control messages. Also, in an uplink transport channel, there is an uplink Shared Control Channel (SCCH) that transmits necessary control information for the terminal to receive the uplink SCH. The uplink SCCH transmission includes information regarding a data variation, a data channel coding technique, and a data size where the data is transmitted to the uplink SCH.

In the related art, when the mobile terminal moves from a source cell to a target cell, the mobile terminal uses a RACH to transmit a cell update message to the target cell. Namely, in order to transmit the cell update message, the terminal uses the RACH for an uplink time synchronization with the target cell and for an uplink resource allocation. However, due to a collision possibility of the RACH, the message transmission my be delayed, and a handover processing time is increased because of the possibility of RACH collision.

SUMMARY

The present invention has been developed in order to solve the above described problems of the related art. As a result, the present invention provides a method of transmitting and receiving control radio connection information that allows a faster and an efficient way of accessing a terminal to a target base station while performing a handover for the terminal to a cell of the target base station.

DESCRIPTION

One aspect of the present invention is the recognition by the present inventors regarding the problems and drawbacks of the related art described above and explained in more detail hereafter. Based upon such recognition, the features of the present invention have been developed.

In the related art, when the mobile terminal moves from a source cell to a target cell, the mobile terminal uses a RACH to transmit a cell update message to the target cell. However, because of a possibility for a RACH collision (i.e. the same signature is being selected from multiple terminals that use of the RACH), the processing time for the handover process may be delayed.

In contrast, the features of the present invention provide that the terminal receives necessary information from a source cell in advance (i.e., before the terminal transmits a RACH setup request to a network) in order to utilize the RACH in a later step. As a result, the terminal can connect with the target cell with minimal delays.

It should be noted that the features of the present invention may be related to issues regarding the long-term evolution (LTE) of the 3GPP standard. As such, the 3GPP standard and its related sections or portions thereof, as well as various developing enhancements thereof pertain to the present invention. For example, in present invention, a source enhanced Node B (eNB) may manage the source cell described above and a target enhanced Node B (eNB) may manage the target cell.

Figure 1:
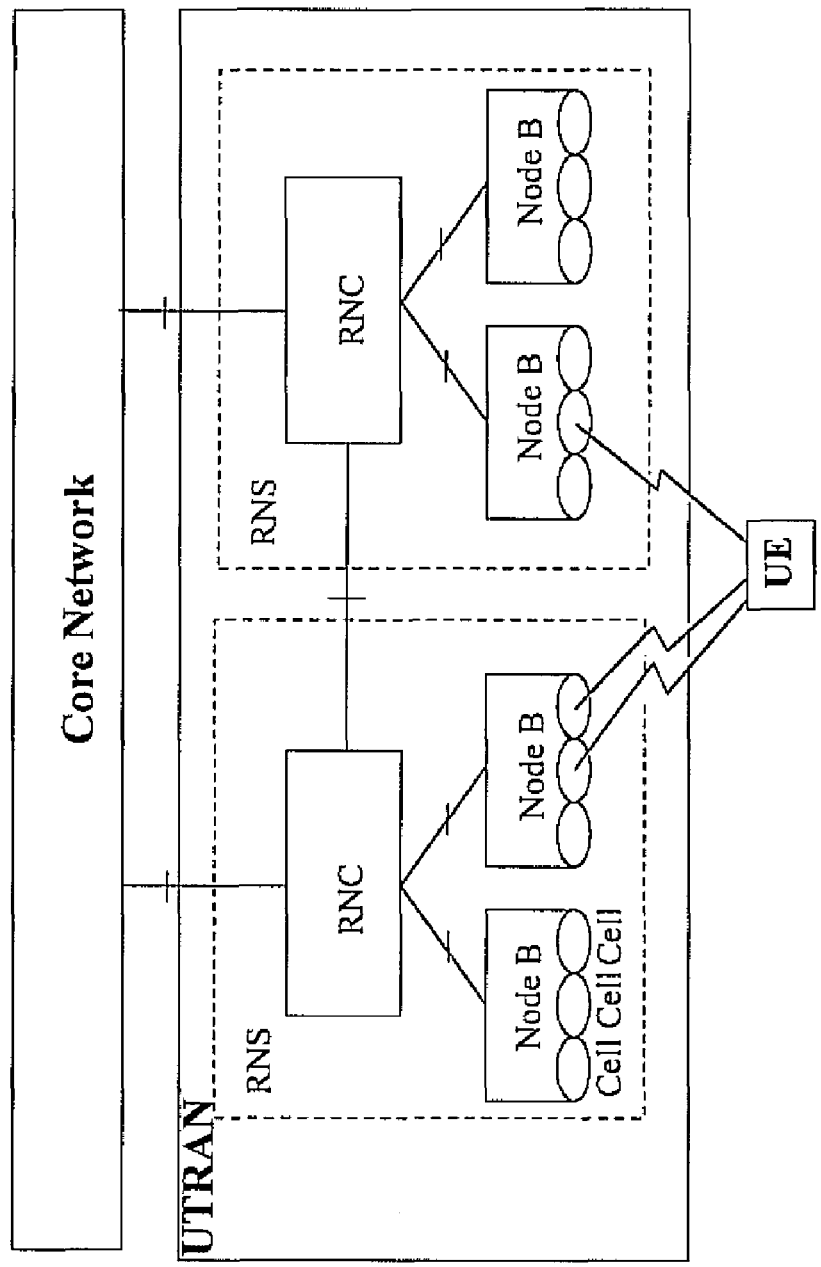
FIG. 1 shows an exemplary diagram illustrating an Universal Mobile Telecommunication System (UMTS) network of a conventional mobile communication system.
Figure 2:
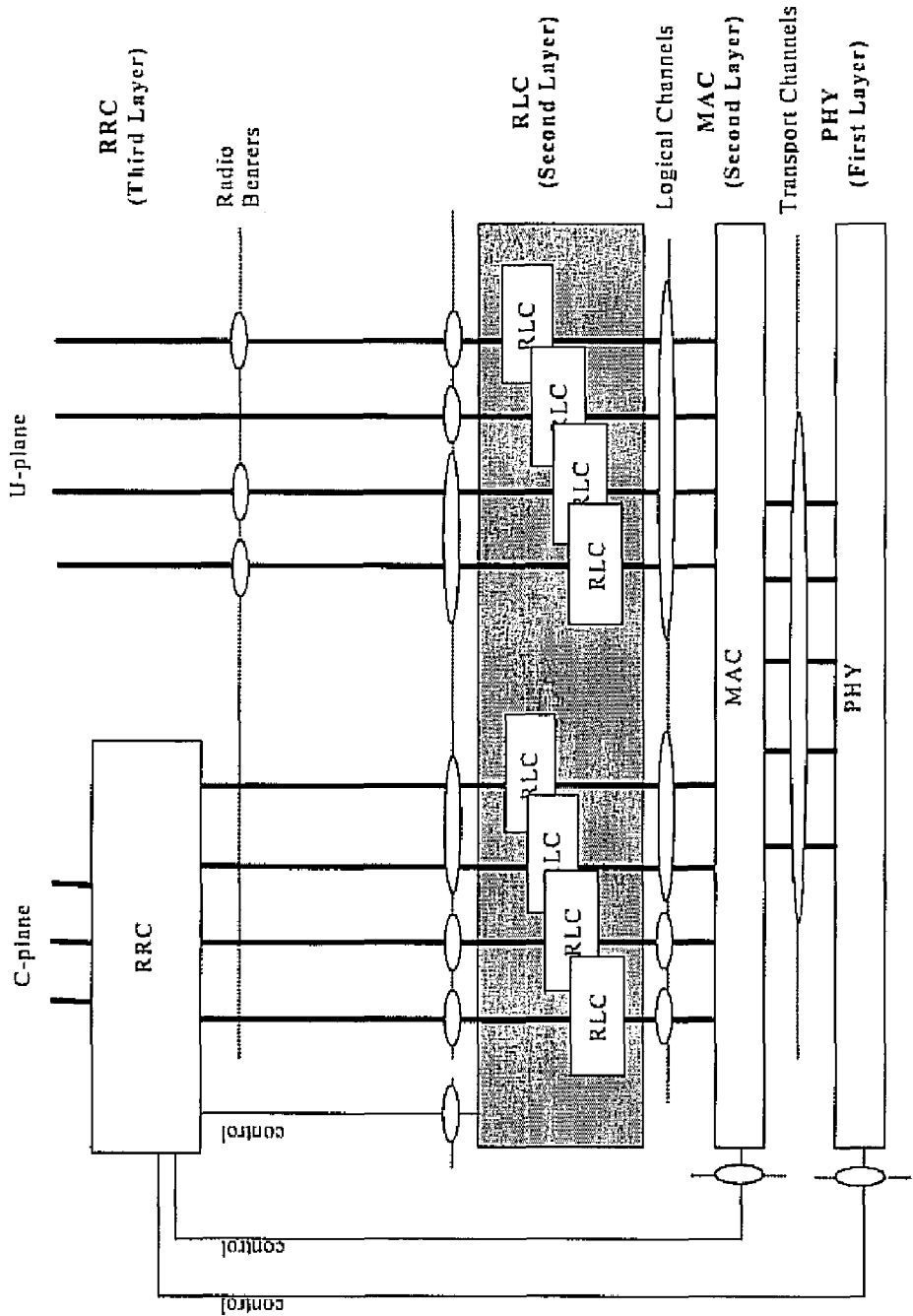
FIG. 2 shows an exemplary diagram illustrating a structure of a Radio Interface Protocol (RIP) between a UE and the UTRAN.
Figure 3:
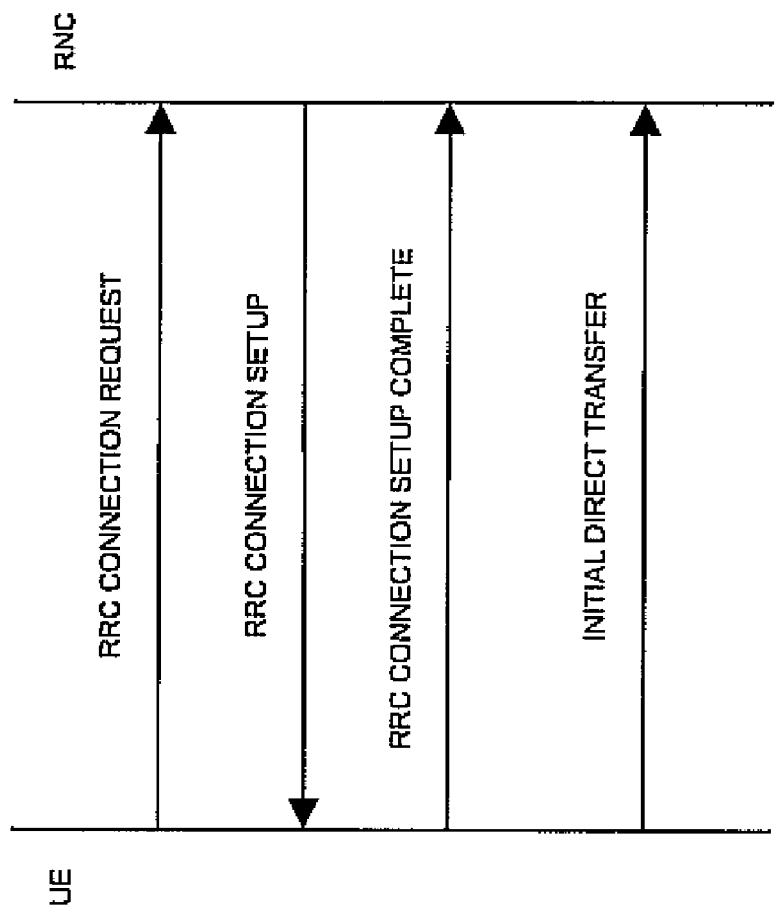
FIG. 3 shows an exemplary diagram for explaining how a RRC connection is established.
Figure 5:
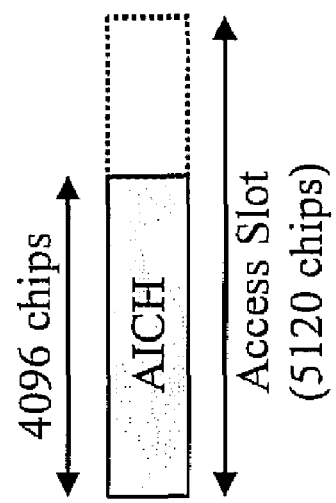
FIG. 5 illustrates an exemplary structure of an Acquisition Indicator Channel (AICH).
Figure 4:
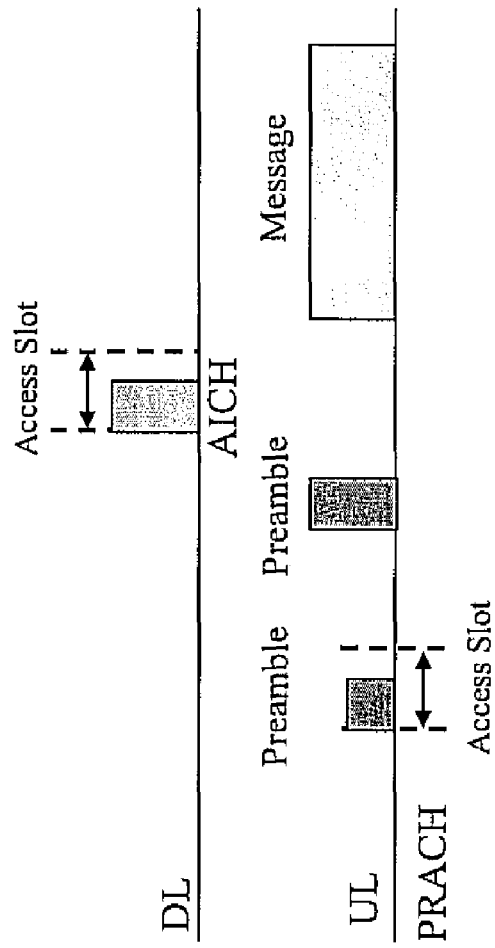
FIG. 4 shows how the physical random access channel (PRACH) power ramping and message transmission may be performed.
Figure 6:
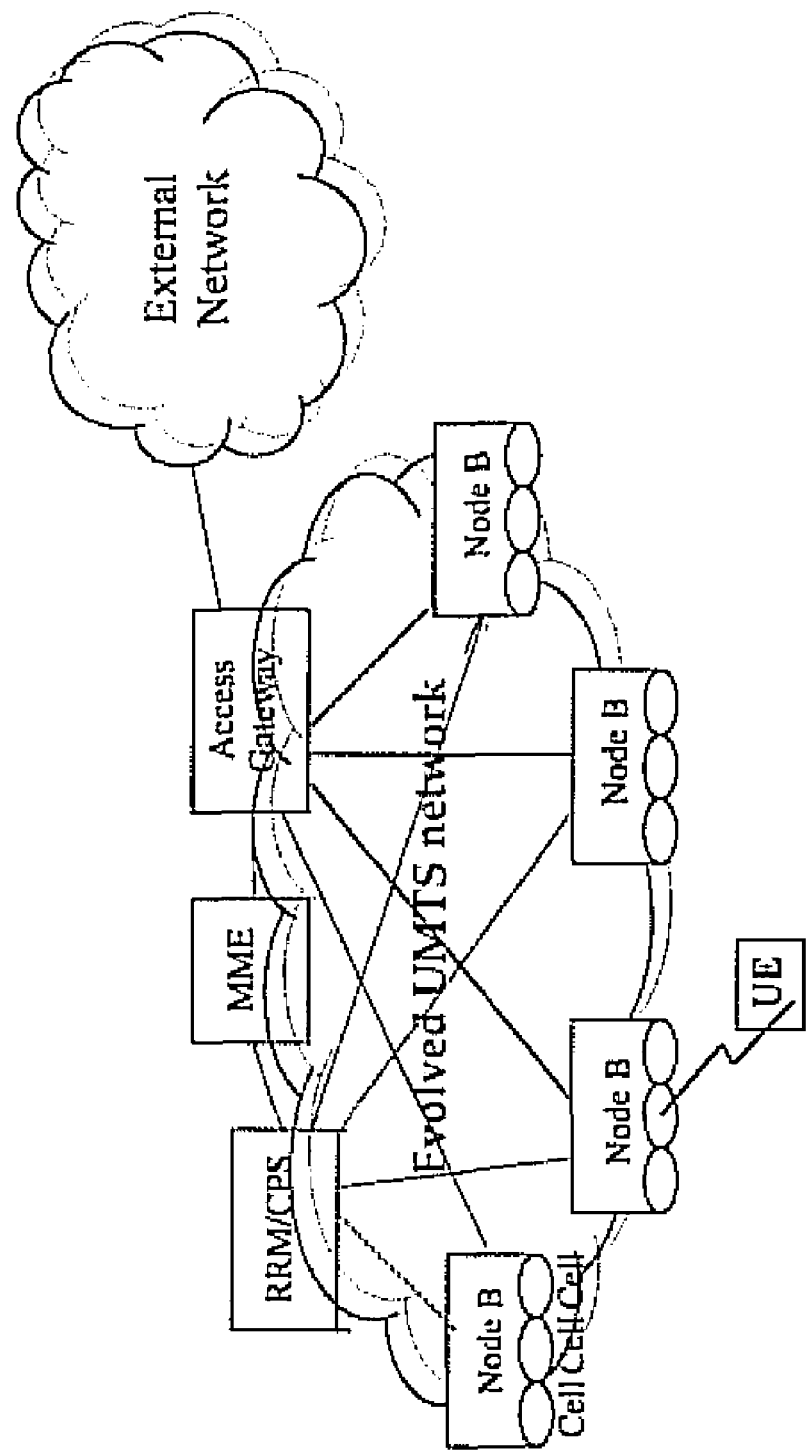
FIG. 6 shows an overview of an E-UMTS network architecture.
Figure 8:
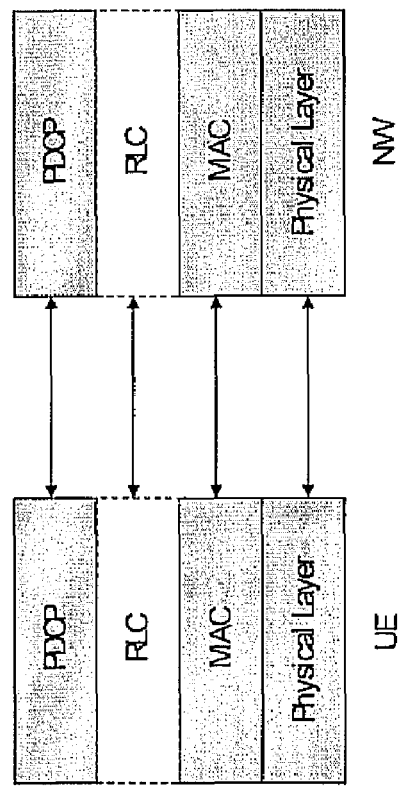
FIGS. 7 and 8 show an exemplary structure (architecture) of a radio interface protocol between a mobile terminal and a UTRAN according to the 3GPP radio access network standard.
Figure 7:
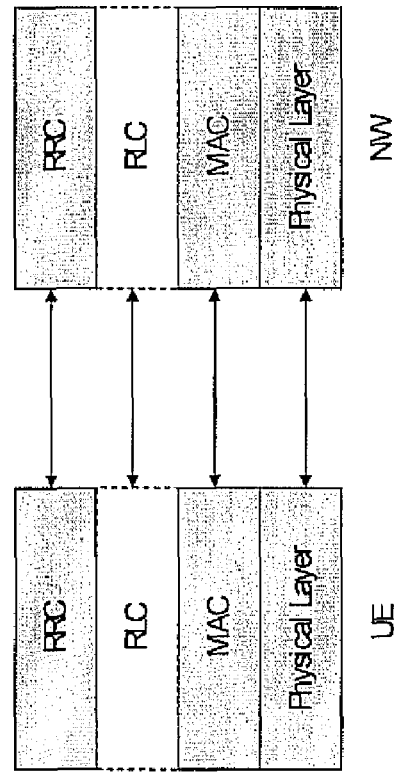
Figure 9:
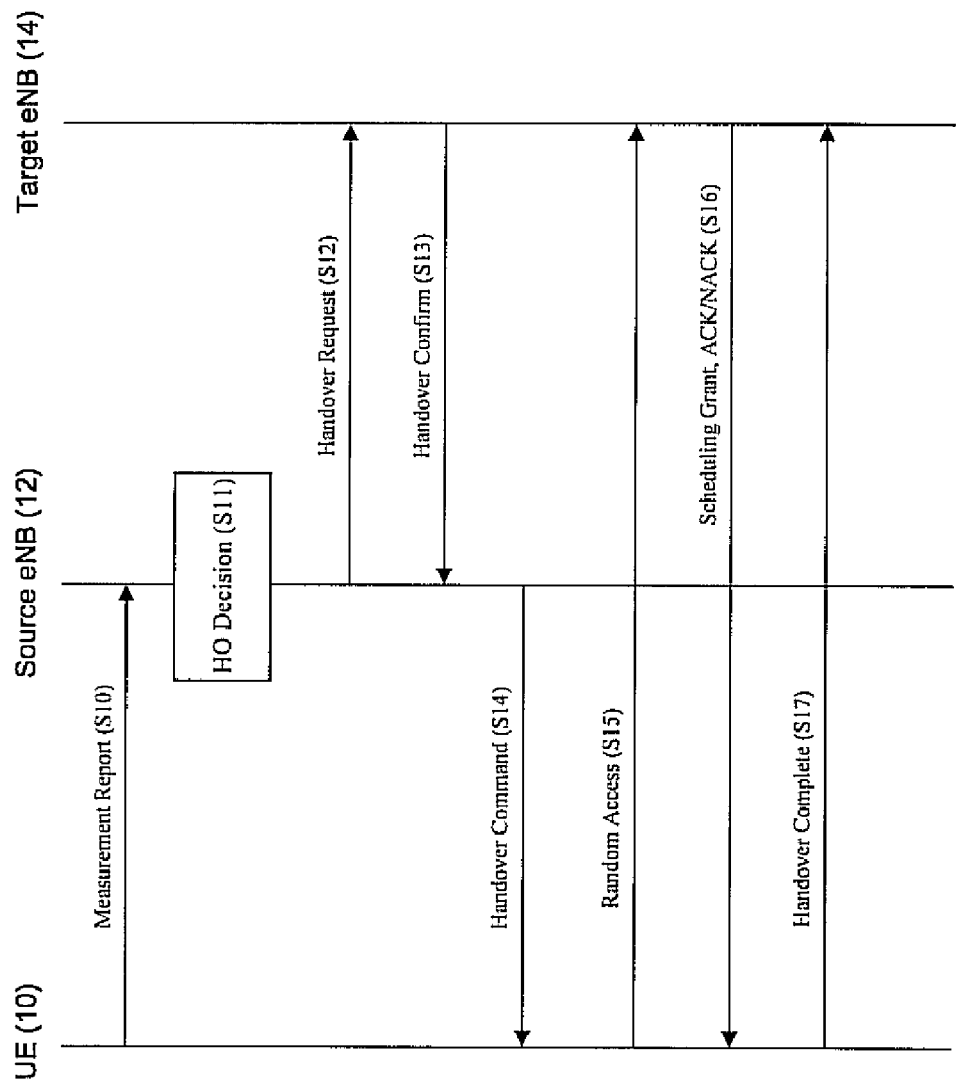
FIG. 9 shows an exemplary diagram for transmitting and receiving radio connection information according to an exemplary embodiment of the present invention.

FIG. 9 shows an exemplary diagram for transmitting and receiving radio connection information according to an exemplary embodiment of the present invention.

As illustrated in FIG. 9, the UE (or terminal) (10) may transmit a measurement report to the source eNB (12) by measuring a condition of a downlink physical channel for other cells periodically or upon the occurrence of event (i.e., user command, setting information, etc) (S10). As the measurement report is transmitted to the source eNB with a result for the measured condition of the downlink physical channel for other cells, the eNB may determine which cell, that the UE will be moved to, has a better channel condition compared to the current cell.

Using the measurement report which contains information about the condition of the downlink physical channel for other cells, the source eNB (12) may determine whether to perform a handover for the UE (10) from a current cell to the other cell, or whether to keep the UE in current cell (S11).

If the UE (10) needs to perform handover from the source eNB to an other particular cell, the source eNB (12) may transmit a handover request message to the target eNB (14) in order to request a handover for the UE to the target eNB. (S12) Here, the handover request message may include a UE identification (ID) and/or a buffer state of the UE.

If the target eNB (14) allows the handover to be performed for the UE upon receiving the handover request from the source eNB (12); the target eNB (14) may transmit a handover confirm message to the source eNB (12) (S13). The handover confirm message may include information that may be necessary in the course of connecting the UE (10) to the target cell. Namely, the necessary information may include information used in the RACH which is used for performing a radio access procedure from the UE to the target eNB. For example, when the RACH is being used while the UE accesses to the target eNB, the UE may utilize a preamble which is selected from signatures contained in the UE. System information transmitted from the eNB may include signatures related information. So, the UE may transmit the preamble to the eNB after selecting one of the signatures. However, in some cases, one or more UEs could select a same signature because there are a limited number of signatures. Therefore, if two or more UEs transmit the preamble of the same signature to the eNB at the same time, the eNB can not possibly determine which UE transmitted such preamble. To avoid this from happening, the UE should not transmit a preamble that is selected from the signatures used in the RACH during the handover; but rather, the UE may transmit a preamble of a previously defined signature through the handover confirm message from the target eNB. Here, the target eNB may acknowledge the mapping relationship between an UE's ID and the signature, where the UE's ID is transmitted from the Handover Request Message. Therefore, when the UE transmits the preamble to the target eNB for establishing a radio connection to the target cell, the target eNB may determine an ID of the UE using the preamble. Also, the Handover Confirm message may include a transmission characteristic of the preamble that is transmitted from the UE (10) to the target eNB (14). The transmission characteristic may relate to frequency and time used in transmitting the preamble information.

If the source eNB (12) receives the Handover confirm message of the UE from the target eNB (14), the source eNB

(12) may transmit a Handover Command message to the UE (10). (S14) The Handover Command message may include necessary information which comes from the target eNB, for establishing the radio connection to the target eNB. Also, the Handover Command message may include information of the signature and the preamble which is to be used in the access procedure to the target eNB.

The UE (10), which received the handover command message from the source eNB (12), may utilize the RACH for establishing the radio connection between the UE and the target eNB. (S15) Here, the preamble transmission of the UE is based upon information in the handover command message received from the source eNB (12). Also, if the information includes system information of the target eNB (14), the UE (10) may perform a radio accessing procedure without reading broadcast system information from the target eNB (14). For example, when the UE performs to establish the radio connection with a new cell, the UE usually reads system information of the corresponding eNB after time synchronization of the downlink. Since the system information includes information related to a radio access request message from the UE to an uplink, the radio accessing is performed after reading the system information. However, according to the present invention, the UE (10) may perform the radio access procedure without reading the system information in the target cell, as the system information of the target eNB is previously transmitted to the source eNB in advance and the system information was included in the handover command message.

The target eNB (14) may receive the preamble of the UE. Since the target eNB (14) already allocates a signature used in the preamble to the UE in the use of handover, the UE can be identified by the preamble. The target eNB (14) may allocate the uplink radio resource to the UE (10) for the UE to access the target eNB and to transmit the handover complete message to the target eNB. (S16) Also, the allocated radio resources information may be transmitted to the UE (10) via a downlink SCH. Alternatively, the allocated radio resources information may be transmitted via a downlink SCCH. Further, the allocated radio resources may be transmitted within an ACK/NACK signaling.

The UE (10) may transmit the handover complete message to the target eNB (14) based on a scheduling grant of the target eNB. (S17) If the scheduling grant includes information of allocated radio resources upon an allocation request of the uplink radio resources of the UE, the scheduling grant may be transmitted with the ACK/NACK signaling of the preamble transmitted from the UE (10). In this case, the Handover complete message from the UE may include a buffer state of the UE or its related information. If the allocated uplink radio resources, which is transmitted from the target eNB (14) to the UE (10), is sufficient, the handover complete message may be transmitted with additional traffic data when there is additional uplink traffic data.

It can be said that the present invention provides a method of transmitting access information in a mobile communications system, the method comprising: deciding to perform a handover for a terminal to a cell of a target base station; transmitting, to the target base station, a handover request for performing a handover from a source base station to the target base station; receiving access information from the target base station that received the handover request, wherein the access information is then transmitted to the terminal to access the target base station; receiving a measurement report from the terminal; determining whether to perform a handover based upon the received measurement report; and transmitting a handover command that contains the access information to the terminal upon receiving the response by the source base station, wherein the measurement report includes a downlink physical channel condition for multiple cells including the cell of the target base station, the handover request includes at least one of terminal identification (ID) information and/or buffer state information of the terminal, the access information is random access information, the access information is for a random access channel (RACH), the access information includes at least one of signature information and/or preamble information, the signature information is determined by the target base station based upon terminal identification information, the preamble information includes frequency information and time information, and the handover command includes access information which contains at least one of signature information and/or preamble information to allow the terminal to access the target base station.

Also, the present invention may provide a method of transmitting access information in a mobile communications system, the method comprising: receiving, from a source base station, a handover request for performing a handover from the source base station to a target base station; transmitting access information to the source base station upon receiving the handover request, wherein the access information is used to allow a terminal to access the target base station; allocating a radio resource for an uplink and transmitting radio resource allocation information to the terminal; receiving, from the terminal, preamble information of the terminal; and receiving a handover complete message from the terminal, wherein the radio resource allocation information is transmitted to the terminal through at least one of a downlink shared channel (SCH) and a downlink shared control channel (SCCH), an ACK/NACK signal includes the allocated resource information, the preamble information is used to identify the terminal, the handover complete message includes at least one of buffer state information of the terminal and uplink traffic data, and the handover complete message includes uplink traffic data if the radio resource allocation for the uplink is sufficient to transmit the uplink traffic data.

It can be said that the present invention provides a method of receiving access information in mobile communications system, the method comprising: receiving access information from a source base station after a handover is accepted by a target base station; performing a random access procedure with the target base station using the received access information; transmitting a measurement report to the source base station by measuring a condition of a downlink physical channel for other cells, the measuring performed periodically or upon an occurrence of an event; transmitting the preamble information to the target base station for performing a radio access procedure with the target cell; receiving, from a network, radio resource information through a downlink shared channel (SCCH); receiving, from a network, radio resource information within an ACK/NACK signaling; and transmitting a handover complete message to the target base station, wherein the measurement report is used to determine whether to perform a handover from a current cell to an other cell, the access information is random access information for a random access channel (RACH) which includes preamble information within signature information, the access information includes a transmission characteristic of the preamble information, the transmission characteristic relates to frequency and time used in transmitting the preamble information, the access information includes system information transmitted from the target base station, and the handover complete message includes at least one of buffer state information of the terminal and uplink traffic data.

The present invention also may provide a mobile terminal for establishing a radio connection to a target base station in a mobile communications system, the mobile terminal comprising: a radio protocol adapted to receive access information from a source base station after a handover is accepted by the target base station and to perform a random access procedure with the target base station using the received access information, wherein the source base station is a source enhanced Node B (source eNB) and the target base station is a target enhanced Node B (target eNB) respectively in an Evolved Universal Mobile Telecommunication System (E-UMTS).

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. the present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting access information in a mobile communications system, the method comprising:

deciding to perform a handover for a terminal to a cell of a target base station;

transmitting, from a source base station to the target base station, a handover request for performing a handover of the terminal from the source base station to the target base station;

receiving, at the source base station, access information from the target base station that received the handover request, wherein the receiving of the access information occurs after the transmitting of the handover request; and transmitting, from the source base station to the terminal, the access information being configured to permit the terminal to access the target base station;

wherein the access information includes preamble information for a random access procedure, wherein the preamble information is a dedicated preamble used only for a specific terminal, and wherein the dedicated preamble is determined by the target base station.

2. The method of claim 1, further comprising:
receiving a measurement report from the terminal.

3. The method of claim 2, wherein the measurement report includes a downlink physical channel condition for multiple cells including the cell of the target base station.

4. The method of claim 3, further comprising:
determining whether to perform a handover based upon the received measurement report.

5. The method of claim 1, wherein the access information is for a random access channel (RACH).

6. The method of claim 1, wherein the preamble information includes frequency information and time information.

7. The method of claim 1, further comprising: transmitting a handover command that contains the access information to the terminal upon receiving the access information by the source base station.

8. A method of transmitting access information in a mobile communications system, the method comprising:

receiving, at a target base station from a source base station, a handover request for performing a handover of a terminal from the source base station to the target base station; and transmitting, from the target base station to the source base station, access information upon receiving the handover request, wherein the access information is used to allow the terminal to access the target base station, wherein the access information includes preamble information for a random access procedure, wherein the preamble information is a dedicated preamble used only for a specific terminal, and wherein the dedicated preamble is determined by the target base station.

9. The method of claim 8, further comprising: allocating a radio resource for an uplink and transmitting radio resource allocation information to the terminal.

10. The method of claim 9, wherein the radio resource allocation information transmits to the terminal through at least one of a downlink shared channel (SCH) and a downlink shared control channel (SCCH).

11. The method of claim 10, wherein an ACK/NACK signal includes the allocated resource information.

12. The method of claim 8, wherein the preamble information is used to identify the terminal.

13. The method of claim 8, further comprising:
receiving a handover complete message from the terminal.

14. The method of claim 13, wherein the handover complete message includes uplink traffic data if the radio resource allocation for the uplink is sufficient to transmit the uplink traffic data.

15. A method of receiving access information in a mobile communications system, the method comprising:
    receiving access information from a source base station after a handover request is accepted by a target base station,
    wherein the access information includes preamble information for a random access procedure,
    wherein the preamble information is a dedicated preamble used only for a specific terminal, and
    wherein the dedicated preamble is determined by the target base station; and
    performing the random access procedure with the target base station using the received access information, such that the access information is configured to permit the terminal to access the target base station.

16. The method of claim 15, further comprising:
    transmitting a measurement report to the source base station by measuring a condition of a downlink physical channel for other cells, the measuring performed periodically or upon an occurrence of an event.

17. The method of claim 16, wherein the measurement report is used to determine whether to perform a handover from a current cell to one of the other cells.

18. The method of claim 15, further comprising:
    transmitting the preamble information to the target base station for performing a radio access procedure with the target cell.

19. The method of claim 15, wherein the access information includes a transmission characteristic of the preamble information, and the transmission characteristic relates to frequency and time used in transmitting the preamble information.

20. The method of claim 15, wherein the access information includes system information transmitted from the target base station.

21. The method of claim 15, further comprising:
    receiving, from a network, radio resource information through a downlink shared channel (SCCH).

22. The method of claim 15, further comprising:
    receiving, from a network, radio resource information within an ACK/NACK signaling.

23. The method of claim 15, further comprising:
    transmitting a handover complete message to the target base station.

24. A mobile terminal for establishing a radio connection to a target base station in a mobile communications system, the mobile terminal comprising:
    a radio protocol adapted to receive access information from a source base station after a handover request is accepted by the target base station and to perform a random access procedure with the target base station using the received access information, such that the access information is configured to permit the terminal to access the target base station,
    wherein the access information includes preamble information for the random access procedure,
    wherein the preamble information is a dedicated preamble used only for a specific terminal, and
    wherein the dedicated preamble is determined by the target base station.

25. The terminal of claim 24, wherein the source base station is a source enhanced Node B (source eNB) and the target base station is a target enhanced Node B (target eNB) respectively in an Evolved Universal Mobile Telecommunication System (E-UMTS).

26. The method of claim 1, wherein the access information permits the terminal to access the target base station via a random access channel (RACH).

* * * * *